(12) United States Patent
Ogino et al.

(10) Patent No.: US 6,539,289 B2
(45) Date of Patent: Mar. 25, 2003

(54) ON-VEHICLE DISPLAY APPARATUS

(75) Inventors: Takayuki Ogino, Iwaki (JP);
Hidetsugu Suko, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/186,326

(22) Filed: Jun. 27, 2002

(65) Prior Publication Data

US 2003/0023352 A1 Jan. 30, 2003

(30) Foreign Application Priority Data

Jul. 6, 2001 (JP) ........................................ 2001-206140

(51) Int. Cl.⁷ ............................................. G06F 165/00
(52) U.S. Cl. ............................. 701/1; 701/36; 701/200
(58) Field of Search ............................. 701/1, 2, 29, 36, 701/49, 200, 207, 208, 213

(56) References Cited

U.S. PATENT DOCUMENTS

| | | | | |
|---|---|---|---|---|
| 5,453,929 A | * | 9/1995 | Stove ............................ | 701/1 |
| 5,471,389 A | * | 11/1995 | Hahlganss ...................... | 701/36 |
| 5,510,983 A | * | 4/1996 | Lino ............................... | 701/1 |
| 5,794,164 A | * | 8/1998 | Beckert et al. ................ | 701/36 |
| 6,029,110 A | * | 2/2000 | Zuber et al. ................... | 701/36 |
| 6,256,558 B1 | | 7/2001 | Sugiura et al. | |

* cited by examiner

*Primary Examiner*—Richard M. Camby
(74) *Attorney, Agent, or Firm*—Brinks Hofer Gilson & Lione

(57) ABSTRACT

An on-vehicle display apparatus includes an operation unit, a display unit including a display screen, and a control unit that controls the display unit based on an operation of the operation unit. The operation unit includes operation keys for issuing operation instructions selectively to a plurality of on-vehicle apparatuses, an operation key for an occupant in a driver seat, and an operation key for an occupant in a passenger seat. An operation guidance screen showing information relating to the content of an operation instruction and the function setting status for a selected on-vehicle apparatus is displayed on a driver-seat side of the display screen when the operation key for an occupant in the driver seat is operated, whereas it is displayed on a passenger-side seat of the display screen when the operation key for an occupant in the passenger seat is operated.

21 Claims, 10 Drawing Sheets

ON-VEHICLE DISPLAY APPARATUS

BACKGROUND OF THE INVENTION

1. Field of the Invention

The present invention relates to on-vehicle display apparatuses, and more specifically to an on-vehicle display apparatus that is capable of displaying information relating to the operation status and information relating to operations of a plurality of apparatuses mounted on a vehicle.

2. Description of the Related Art

On a typical vehicle, various apparatuses such as a navigation apparatus, an audio apparatus (radio, CD, DVD, etc.), an air conditioner, and a communication apparatus for acquiring various information distributed via the Internet are mounted to provide a desirable driving environment. These apparatuses provide various information to a driver at the wheel, and can be controlled as required by operations by the driver. A display unit and an operation switch for showing the operation status of these apparatuses are provided in the vicinity of a driver seat so that the driver can readily recognize the display and perform operations as required.

However, space for providing apparatuses in the vicinity of the driver seat is limited. Thus, it may be that the number of operation units, etc. that can be provided is limited, or the usability of the apparatus operation units is diminished due to the concentration of the apparatus operation units.

In view of the above, a multi-display apparatus has recently become known. In the multi-display apparatus, apparatus operation units are selectively displayed as desired in a large display screen. A function switch disposed in the vicinity of the display screen or a touch switch formed in the display screen, etc., associated with a virtual switch displayed in the display screen, is operated, whereby an associated apparatus is selected, or the content of an operation or the operation status of the apparatus is displayed on the screen. The single multi-display apparatus allows operation and display associated with different types of apparatus, overcoming the disadvantage relating to layout space.

In the multi-display apparatus described above, a function switch, etc. disposed in the vicinity of the display screen, associated with a virtual switch displayed on the display screen, is pressed in order to perform an operation. Thus, the display screen must be disposed within easy reach of the driver at the wheel. At the same time, it is desired that the display screen be disposed as far forward of the driver as possible in a vehicle cabin so that movement of the viewing point of the driver will be minimized between when viewing forward for driving (for recognizing road conditions, etc.) and when viewing the display screen. That is, it is desired that the display screen be disposed as close to the driver as possible in consideration of ease of operation, and at the same time, it is desired that the display screen be disposed as far from the driver as possible in consideration of minimum movement of viewing point, the two conditions being hardly compatible.

As a technique for overcoming this problem, for example, Japanese Unexamined Patent Publication Application No. 2001-113981 discloses a display apparatus in which a display unit and an operation unit are provided separately. However, according to the technique disclosed in the publication, the display apparatus including the separate display unit and the operation unit is fixed in a vehicle cabin, only in consideration of the convenience of the driver.

Thus, when an occupant in a passenger seat tries to operate, for example, an audio source to listen to music of his/her interest, since the apparatus is laid out only in consideration of the convenience of the driver, the apparatus is not necessarily easy to operate for the occupant in the passenger seat, and display of information relating to operation guidance is not easy to recognize.

Furthermore, according to the conventional art, components of the display apparatus including the operation unit and the display unit are not integrated, and the components are embedded in a console panel in the vehicle cabin as they are. Thus, effective integration of the functions of the components is inhibited, and flexibility in the layout of the components is limited.

SUMMARY OF THE INVENTION

The present invention has been made in view of the problems of the conventional art, and it is an object of the present invention to provide an on-vehicle display apparatus in which visibility and ease of operation relating to the display of operation guidance are improved both for an occupant in a driver seat and for an occupant in a passenger seat.

It is another object of the present invention to provide an on-vehicle display apparatus in which flexibility in the layout of components is achieved and in which functions are effectively integrated.

To these ends, the present invention, in one aspect thereof, provides an on-vehicle display apparatus connected to a plurality of apparatuses mounted on a vehicle. The on-vehicle display apparatus includes an operation unit including an operation switch for issuing operation instructions selectively to the plurality of apparatuses and an operation detecting unit for detecting the status as to whether an operation is performed by an occupant in a driver seat or by an occupant in a passenger seat; a display unit including a display screen; and a control unit for controlling the display unit according to an operation of the operation unit. The control unit controls the display unit so that an operation guidance screen associated with an apparatus selected from the plurality of apparatuses will be displayed on the driver-seat side of the display screen when it is detected that the occupant in the driver seat is operating the operation unit, whereas the operation guidance screen will be displayed on the passenger-seat side of the display screen when it is detected that the occupant in the passenger seat is operating the operation unit.

Preferably, the operation detecting unit includes an operation key for the occupant in the driver seat and an operation key for the occupant in the passenger seat, the operation key for the occupant in the driver seat being disposed closer to the driver seat and the operation key for the occupant in the passenger seat being disposed closer to the passenger seat.

Also preferably, the operation unit, the display unit, and the control unit are embedded, in the form of an integrated module unit, in a console panel in a vehicle cabin.

The operation detecting unit may be implemented by a non-contact sensor provided in the module unit, detecting motion of the occupant in the driver seat or motion of the occupant in the passenger seat coming closer to the operation detecting unit. The non-contact sensor may be, for example, an infrared sensor attached to the module unit.

Preferably, the control unit may control the display unit so that a map screen associated with navigation will be displayed on the opposite side of the operation guidance screen on the display screen, and the map screen will be moved to the opposite side when the display position of the operation guidance screen is switched.

The control unit may control the display unit so that the operation guidance screen will be displayed semi-transparently. The control unit may control the display unit so that a remaining section other than a display section associated with the content of an operation instruction and function setting status in the operation guidance screen will be displayed semi-transparently.

The operation unit preferably includes a first set of operation keys for selecting an operation mode associated with one of the plurality of apparatuses, and also includes a second set of operation keys for changing an operation instruction and function setting for the operation mode associated with the selected apparatus. The operation modes respectively associated with the plurality of apparatuses include, for example, an air conditioner operation mode, an audio operation mode, and a navigation operation mode. The second set of operation keys may include a haptic operation key.

The on-vehicle display apparatus may further include a speaker for providing information relating to the content of an operation instruction and the function setting status for the selected apparatus.

The present invention, in another aspect thereof, provides an on-vehicle display apparatus connected to a plurality of apparatuses mounted on a vehicle. The on-vehicle display apparatus includes an operation unit including an operation switch for issuing operation instructions selectively to the plurality of apparatuses and an operation detecting unit for detecting the status as to whether an operation is being performed by an occupant in a driver seat or by an occupant in a passenger seat; a display unit including a display screen; and a control unit for controlling the display unit according to an operation of the operation unit. The control unit stores the function setting status set by the occupant in the driver seat and by the occupant in the passenger seat, and controls the display unit so that an operation guidance screen associated with an apparatus selected from the plurality of apparatuses will be displayed on the driver-seat side of the display screen based on the function setting status set by the occupant in the driver seat when it is detected that the occupant in the driver seat is operating the operation unit, whereas the operation guidance screen will be displayed on the passenger-seat side of the display screen based on the function setting status set by the occupant in the passenger seat when it is detected that an occupant in the passenger seat is operating the operation unit.

The control unit may store a category of music set by the occupant in the driver seat or the occupant in the passenger seat.

The control unit may store a category of news set by the occupant in the driver seat or the occupant in the passenger seat.

The control unit may store a temperature on a driver-seat side, set by the occupant in the driver seat, and a temperature on a passenger-seat side, set by the occupant in the passenger seat.

According to an on-vehicle display apparatus of the present invention, the display of an operation guidance screen is switched between a driver-seat side and a passenger-seat side in a display screen, preferably based on the operation of an operation key for an occupant in a driver seat or an operation key for an occupant in a passenger seat. Thus, visibility and ease of operation are improved both for the occupant in the driver seat and for the occupant in the passenger seat.

Furthermore, when an on-vehicle display apparatus of the present invention is implemented entirely in the form of an integrated module embedded in a central part of a console panel, flexibility in layout of components (operation unit, display unit, and control unit) is achieved, and the functions can be effectively integrated.

DESCRIPTION OF THE PREFERRED EMBODIMENTS

Preferred embodiments of the present invention will now be described with reference to the accompanying drawings.

Figure 1:
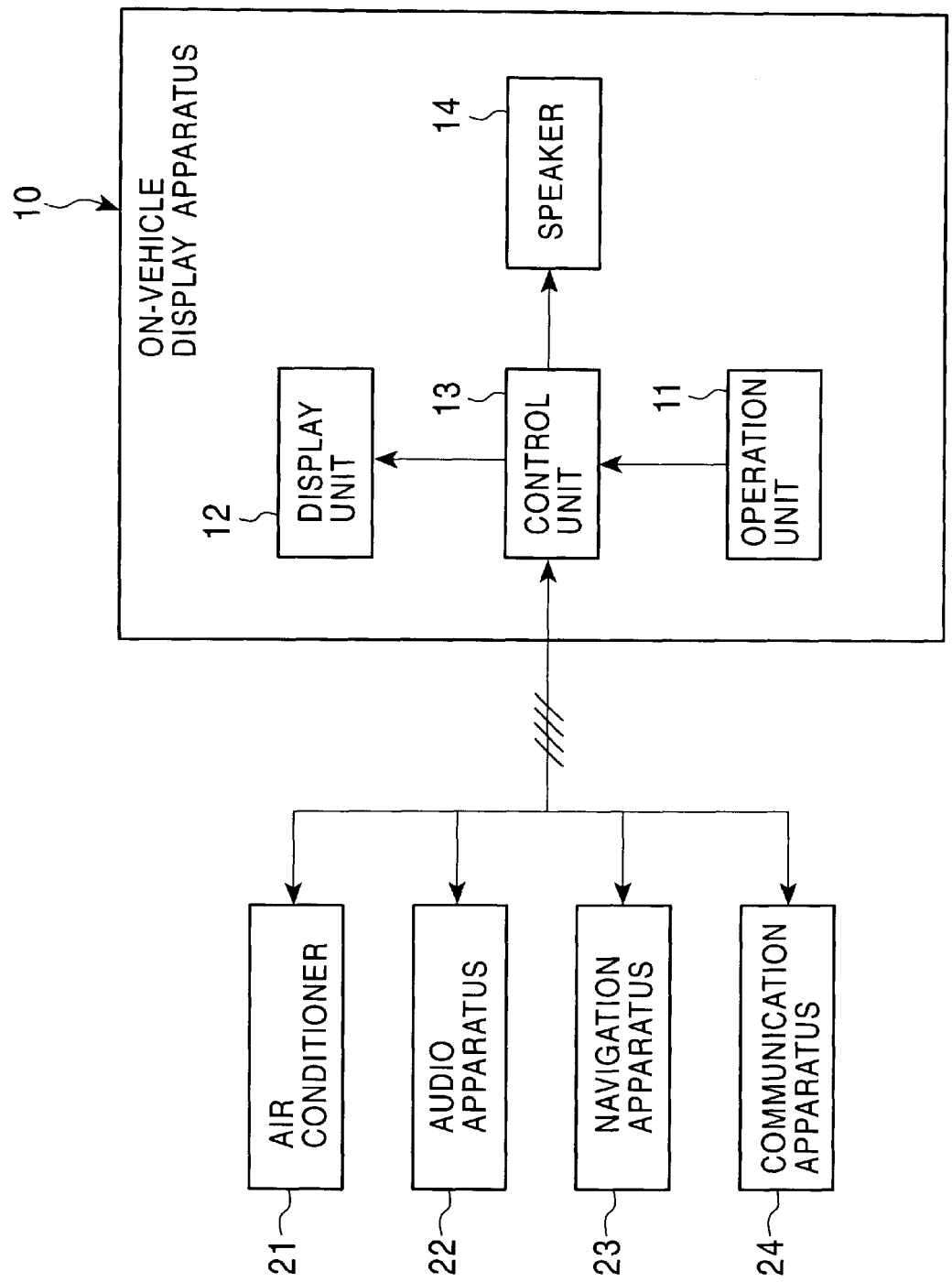
FIG. 1 is a schematic block diagram showing the construction of an on-vehicle display apparatus according to an embodiment of the present invention.

FIG. 1 is a schematic block diagram showing the construction of an on-vehicle display apparatus according to an embodiment of the present invention.

As shown in FIG. 1, an on-vehicle display apparatus 10 according to this embodiment is connected to various apparatuses mounted on the same vehicle, including an air conditioner 21, an audio apparatus 22, a navigation apparatus 23, and a communication apparatus 24. The communication apparatus 24 is used to acquire various information (music, news, etc.) distributed from servers via the Internet.

The on-vehicle display apparatus 10 according to this embodiment includes, as main components thereof, an operation unit 11, a display unit 12, a control unit 13, and a speaker 14. The operation unit 11 includes various operation keys for issuing operation instructions selectively to the on-vehicle apparatuses (i.e., the air conditioner 21, the audio apparatus 22, and the navigation apparatus 23), and also includes an operation key for an occupant in a driver seat (hereinafter referred to as a driver operation key) and an operation key for an occupant in a passenger seat (hereinafter referred to as a passenger operation key), the driver operation key and the passenger operation key constituting a feature of the present embodiment. The operation unit 11 and the display unit 12 will be described later in detail. The control unit 13 mainly controls operations for transmitting data associated with operation instructions input via the operation unit 11 (contents of operation, function setting status, etc.) to the on-vehicle apparatuses 21 to 23 and for controlling the display by the display unit 12 of information showing operation mode, operation status, etc. of the on-vehicle apparatuses 21 to 23 based on response data transmitted from the on-vehicle apparatuses 21 to 23 in response to the operation instructions. Furthermore, the control unit 13 includes an audio amp, and it amplifies an operation sound of the operation keys or sound from audio sources (radio, DVD, etc.) by the audio amp, providing the result via the speaker 14.

Figure 2:
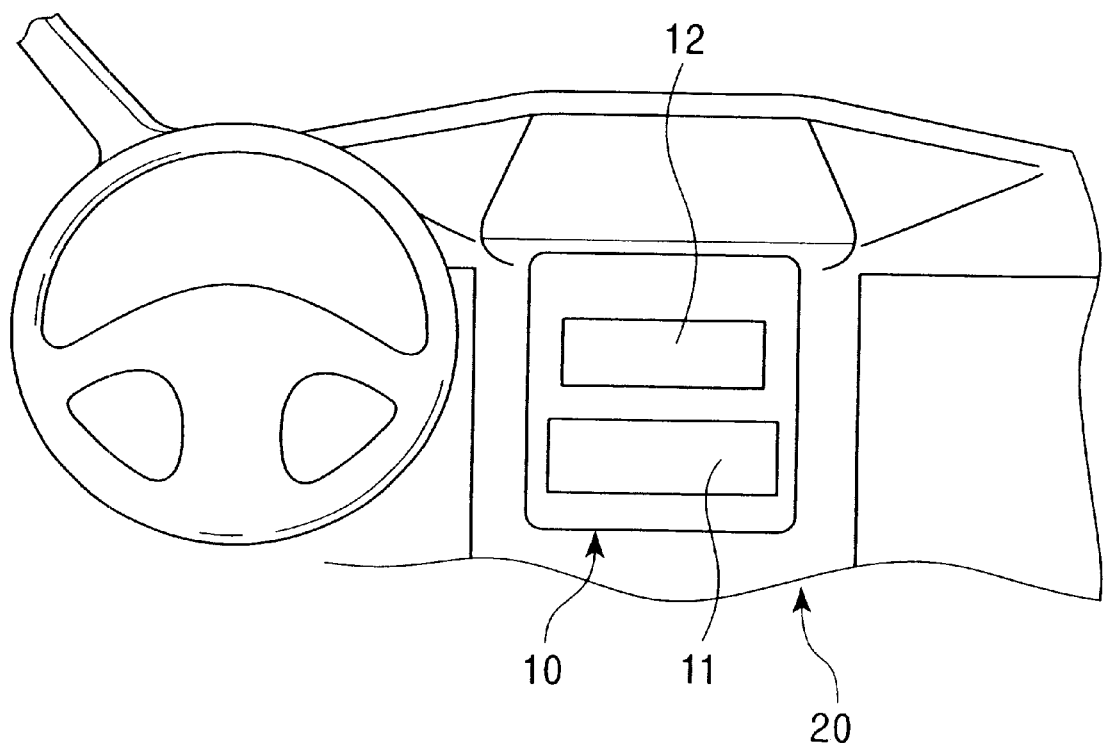
FIG. 2 is a schematic diagram showing a layout of the on-vehicle display apparatus in FIG. 1, mounted in a vehicle cabin.

As schematically shown in FIG. 2, the on-vehicle display apparatus 10 is disposed at a central portion of a console panel 20 in a vehicle cabin, i.e., at a position between the driver seat and the passenger seat and at substantially the same distance from the driver seat and from the passenger seat. Since the control unit 13 of the on-vehicle display apparatus 10, shown in FIG. 1, is embedded within the apparatus and will not be seen from the outside, the control unit 13 is not shown in FIG. 2. Furthermore, the speaker 14, shown in FIG. 1, is not shown in FIG. 2.

As will be described later, as a feature of the on-vehicle display apparatus 10 according to this embodiment, a map screen associated with navigation is displayed as a background screen of the display unit 12, and when an operation mode associated with one of the on-vehicle apparatuses 21 to 23 is selected, an operation guidance screen showing the content of an operation instruction and the function setting status for the associated on-vehicle apparatus is displayed in a display screen of the display unit 12, and display of the operation guidance screen is switched between a driver-seat side and a passenger-seat side based on the operation of the driver operation key and the passenger operation key in the operation unit 11.

When the display position of the operation guidance screen is switched, the map screen is displayed on the opposite side accordingly. (For example, when the operation guidance screen is displayed on the driver-seat side, the map screen is displayed on the passenger-seat side.)

As another feature, the on-vehicle display apparatus 10 according to this embodiment is entirely implemented in the form of an integrated module unit, and is embedded in a central portion of the console panel 20 shown in FIG. 2.

Figure 3:
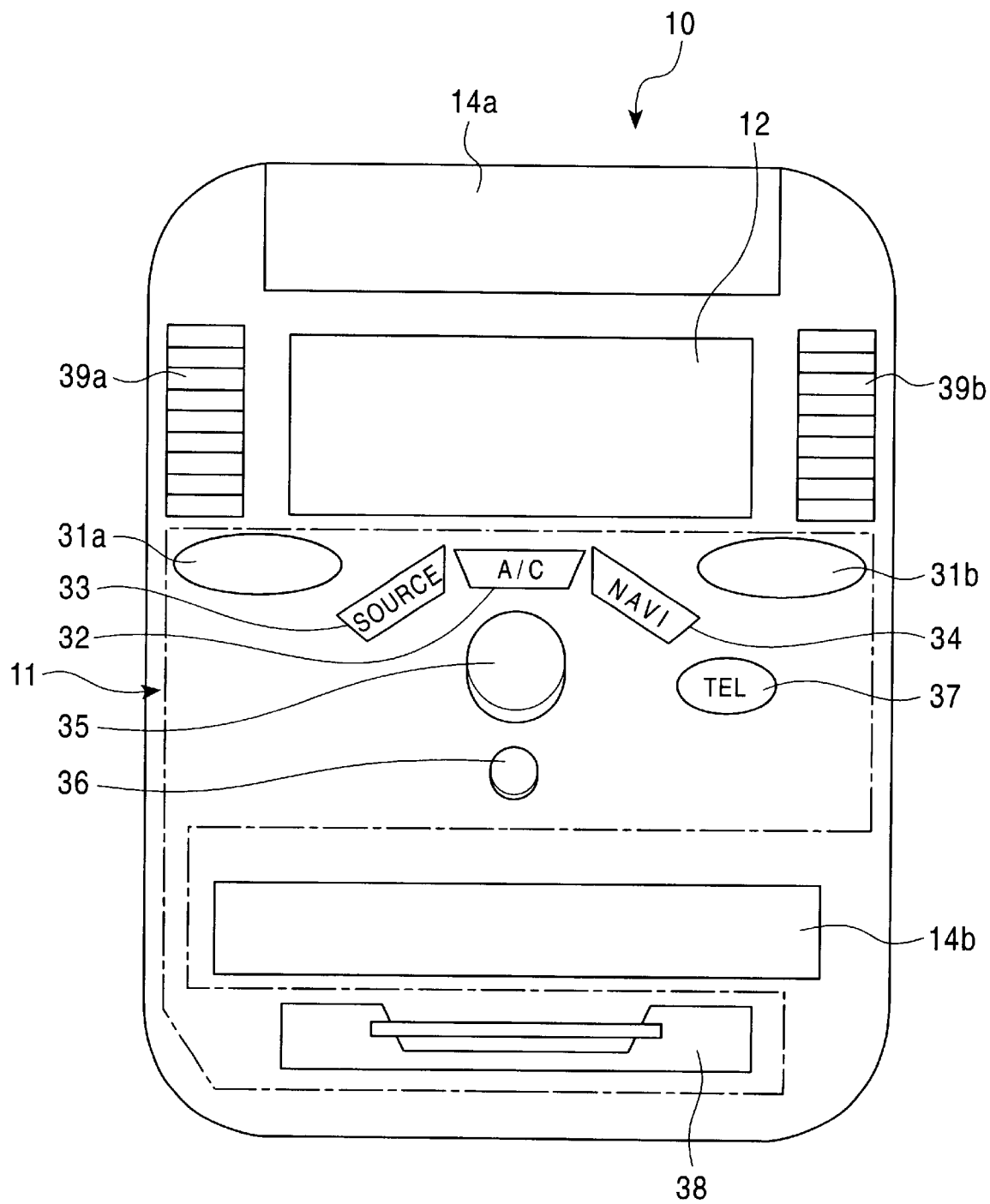
FIG. 3 is a schematic plan view showing the external structure of the on-vehicle display apparatus in FIG. 1.

FIG. 3 is a schematic plan view showing the external structure of the on-vehicle display apparatus (module unit) 10.

As shown in FIG. 3, the display unit 12 is disposed above the middle of a casing, and the operation unit 11 including various operation keys is disposed below the display unit 12. For example, the display unit 12 is implemented by a liquid crystal display (LCD) and provided with a wide display screen having a horizontal-to-vertical ratio of approximately 2 to 1 (e.g., 800 dots×400 dots). The operation unit 11 includes a driver operation key 31a, a passenger operation key 31b, an A/C key 32, a SOURCE key 33, a NAVI key 34, a haptic commander 35 of a rotary operation type, a joystick 36 that can be operated in eight directions, a hands-free phone operation mode selection key (TEL key) 37, and a DVD/CD changer operation key 38. Furthermore, ducts 39a and 39b of the air conditioner 21 are provided on both sides of the display unit 12. Furthermore, a center speaker 14a for reproducing a sound field is provided above the display unit 12, and a subwoofer 14b is provided between the joystick 36 and the DVD/CD changer operation key 38. The center speaker 14a and the subwoofer 14b constitute the speaker 14 in FIG. 1.

The driver operation key 31a and the passenger operation key 31b constitute a feature of the present embodiment. The driver operation key 31a is disposed closer to the driver-seat side of the module unit 10 so that it is within reach of an occupant in the driver seat and can be readily operated. Similarly, the passenger operation key 31b is disposed closer to the passenger-seat side of the module unit 10 so that it is within reach of an occupant in the passenger seat and can be readily operated.

The A/C key 32, the SOURCE key 33, and the NAVI key 34 are used to select operation modes associated with the air conditioner 21, the audio apparatus 22, and the navigation apparatus 23, respectively. As for the SOURCE key 33, one of the operation modes respectively associated with the audio sources is selected each time the SOURCE key 33 is operated (pressed), sequentially in a predetermined order. In this embodiment, each time the SOURCE key 33 is operated, one of the audio sources is selected in order of the satellite radio, AM radio, FM radio, DVD/CD, the satellite radio again, and so forth. At this time, an operation screen associated with a selected audio source is displayed on the display unit (display screen) 12.

The haptic commander 35 is used when one of the "air conditioner operation mode," "audio operation mode," and "navigation operation mode" is selected. The haptic commander 35 exhibits different tactile impressions when different operation modes are selected, and is used to change an operation instruction for an apparatus associated with a selected operation mode. For example, when the air conditioner operation mode is selected, the haptic commander 35 allows a rotary operation in a range of 270°, exhibiting a sense of selection in steps of 18° (setting temperature is changed in steps of 2° F.). When the audio operation mode is selected, the haptic commander 35 allows a rotary operation in a range of 240°, exhibiting a sense of smooth rotation associated with sound volume. When the navigation operation mode is selected, the haptic commander 35 allows a rotary operation in a range of 60°, enabling a "jog dial" operation in which switching is detected at positions respectively upward and downward by 30° with respect to a neutral position and in which the haptic commander 35 returns to the neutral position when released.

The joystick 36 is used in association with the haptic commander 35, to change the function setting for an apparatus associated with a selected operation mode. (That is, an operation menu is selected.) For example, when the air conditioner operation mode is selected, the "wind force" can be changed by operating the joystick 36 in the right-left direction, and an "air outlet" can be selected by operating the joystick 36 in up-down direction. When an FM radio operation mode in the audio operation mode is selected, the "frequency" can be changed by operating the joystick 36 in the right-left direction, and the "preset number" can be changed by operating the joystick 36 in the up-down direction. When the navigation operation mode is selected, a "map screen" can be scrolled in one of the eight directions corresponding to an operation of the joystick 36.

In the module unit 10 according to this embodiment, the A/C key 32, the SOURCE key 33, and the NAVI key 34 constitute a first set of operation keys, while the haptic commander 35 and the joystick 36 constitute a second set of operation keys.

When the driver operation key 31a is operated in a state where one of the apparatuses 21 to 23 has been selected using the associated one of the operation keys 32 to 34, an operation instruction for the selected apparatus has been issued using the haptic commander 35, and a function of the apparatus has been set using the joystick 36, the display of operation guidance (i.e., the operation guidance screen showing information relating to the content of an operation instruction and the function setting status for the selected apparatus) in the display screen of the display unit 12 is switched to the driver-seat side. Similarly, when the passenger operation key 31b is operated in a state where an operation mode associated with an apparatus has been selected, an operation instruction for the selected apparatus has been issued, and a function of the apparatus has been set, the display of operation guidance in the display screen of the display unit 12 is switched to the passenger-seat side.

FIGS. 4 to 9 show example display screens relating to switching of the operation guidance screen by the on-vehicle display apparatus 10 according to this embodiment.

Figure 4:
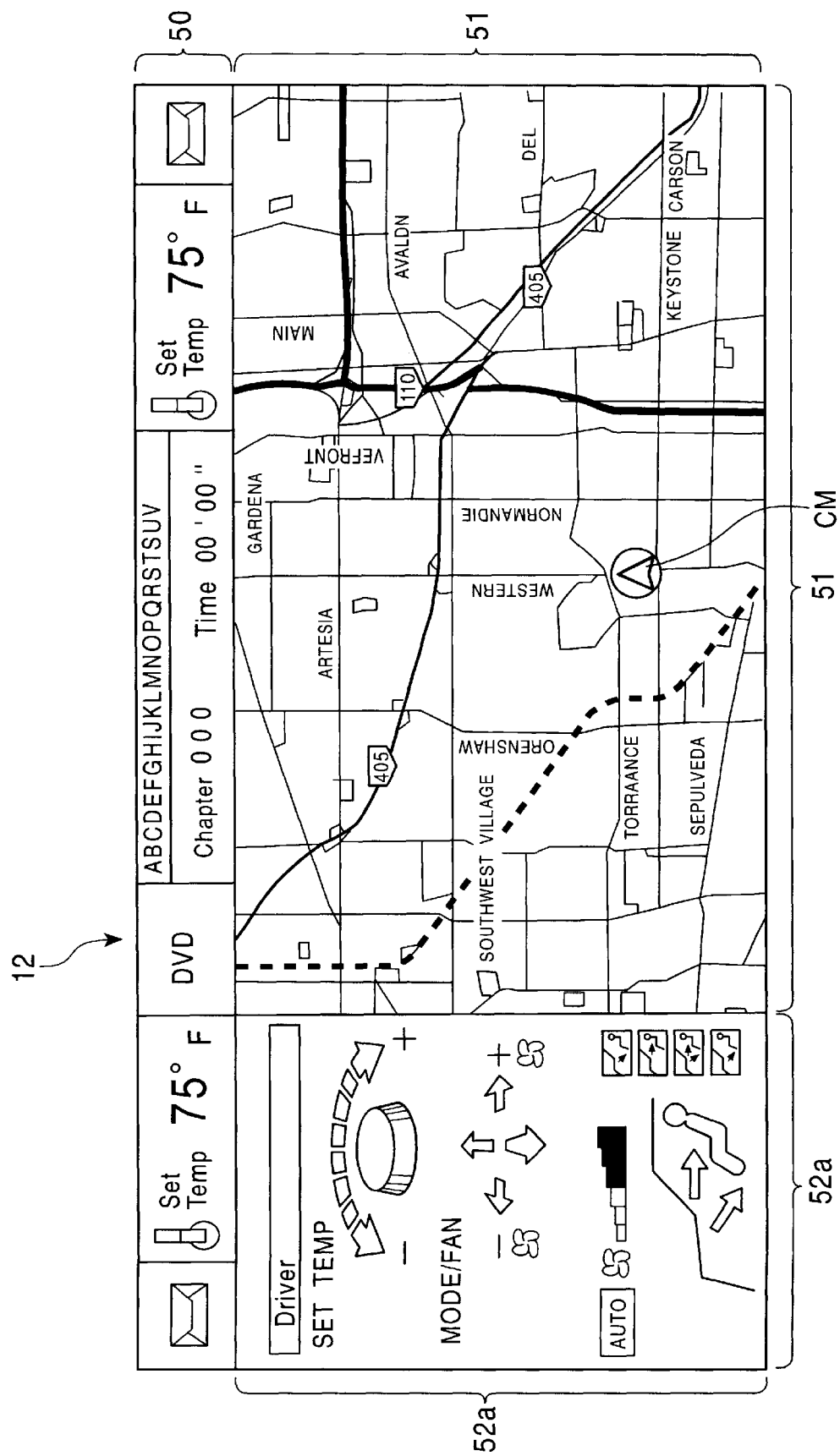
FIG. 4 is an illustration of a first example display screen related to switching of the display of an operation guidance screen.

FIG. 4 shows an example display screen relating to the display of operation guidance associated with the air conditioner (A/C) 21, which is displayed when the driver operation key 31a is operated in a state where the air conditioner operation mode has been set by operating the A/C key 32 and an operation instruction and a function for the air conditioner 21 have been set by operating the haptic commander 35 and the joystick 36.

In the example display screen shown in FIG. 4, "temperature" is set as an operation instruction for the air conditioner 21, and "fan" is set as a function thereof.

In an upper portion of the display screen on the display unit 12, a background information display area 50 is defined. In the remaining portion of the display screen other than the background information display area 50, a map display area (map screen 51) for displaying a map image, and an operation guidance display area (operation guidance screen 52a) for displaying information associated with an operation performed on the driver operation key 31a are defined. Furthermore, in a bottom center portion of the map screen 51, a vehicle position mark CM indicating the current position of the vehicle is displayed.

Although not related to the gist of the present invention and therefore not explicitly shown, the map screen 51 shows a navigation route from the vehicle position (CM) to a destination, automatically determined by the navigation apparatus 23 based on a setting of the destination made by the user. At the same time, the map screen 51 shows, as required, icons representing various buildings, etc. that serve as landmarks at the destination or along the navigation route. In that case, the navigation route is highlighted in a different color and line width from other roads so that the user can readily distinguish it.

Figure 5:
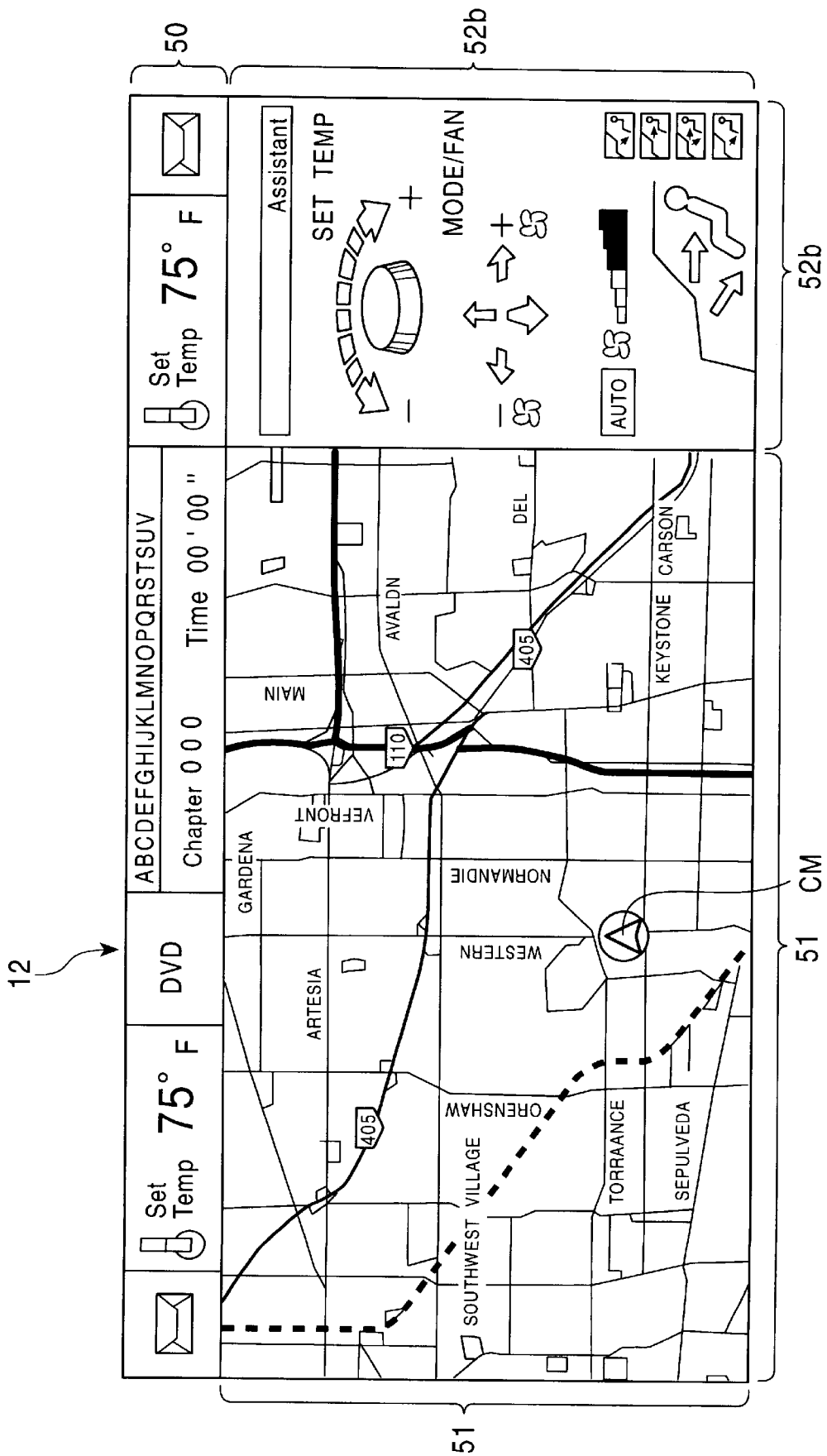
FIG. 5 is an illustration of a second example display screen related to switching of the display of an operation guidance screen.

Similar to FIG. 4, FIG. 5 shows an example display screen relating to the display of operation guidance associated with the air conditioner (A/C) 21, but which is displayed when the passenger operation key 31b is operated in a state where similarly the air conditioner operation mode has been set and an operation instruction and a function for the air conditioner 21 have been set.

In the example display screen shown in FIG. 5, as in FIG. 4, "temperature" is set as an operation instruction for the air conditioner 21, and "fan" is set as a function thereof.

When the passenger operation key 31b is operated in the state of the display screen shown in FIG. 4, the display screen changes to that shown in FIG. 5. That is, the display of operation guidance, which had been on the driver-seat side in the display screen of the display unit 12, is switched to the passenger-seat side by the operation of the passenger operation key 31b (operation guidance screen 52b). Conversely, when the driver operation key 31a is operated in the state of the display screen shown in FIG. 5, the display of operation guidance, which had been on the passenger-seat side, is switched to the driver-seat side (operation guidance screen 52a).

Figure 6:
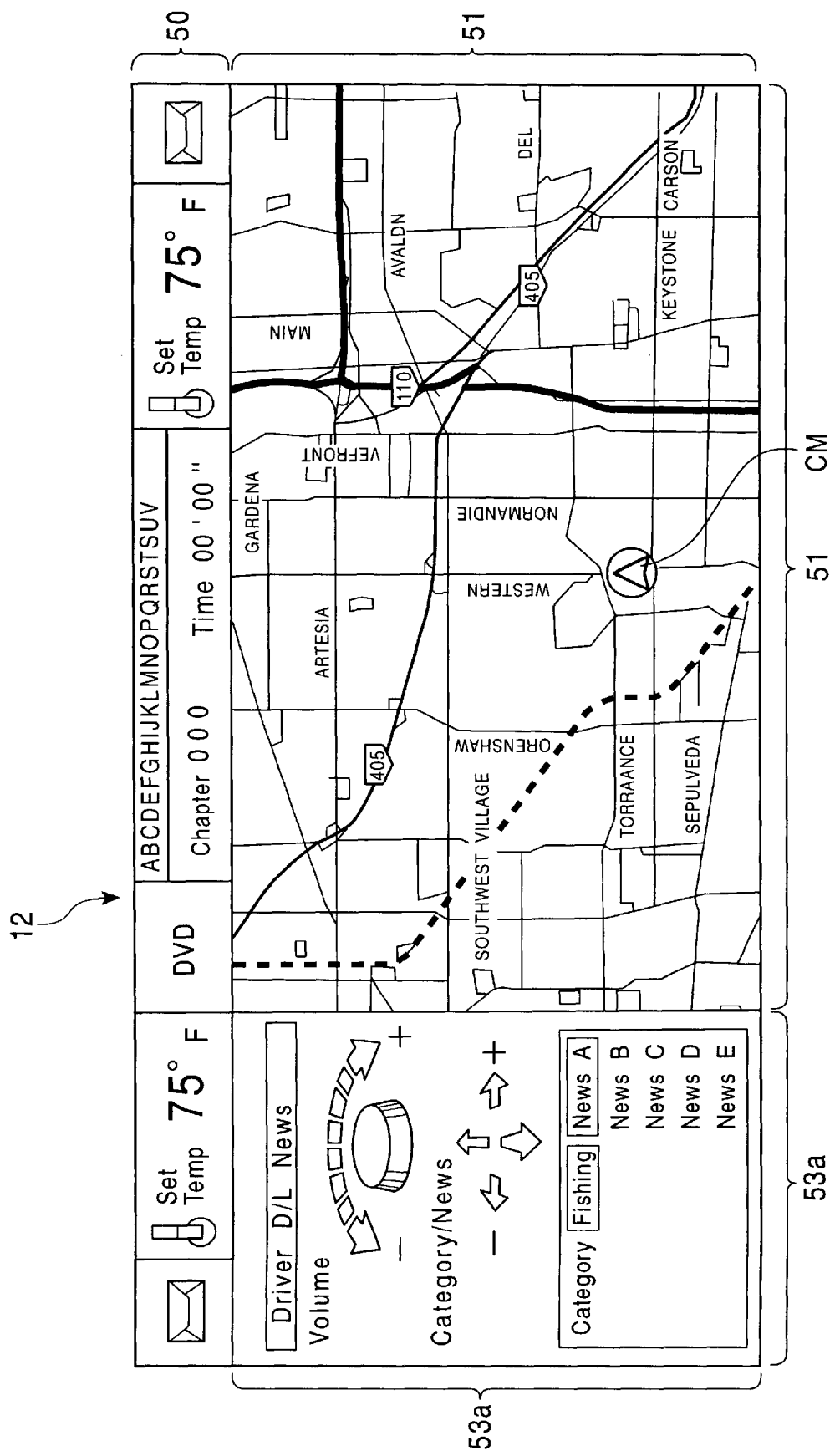
FIG. 6 is an illustration of a third example display screen related to switching of the display of an operation guidance screen.

FIG. 6 shows an example display screen relating to the display of operation guidance associated with an audio source, which is displayed when the driver operation key 31a is selected in a state where the audio operation mode has been selected using the SOURCE key 33, and an operation instruction and a function for the audio source have been set using the haptic commander 35 and the joystick 36.

In the example display screen shown in FIG. 6, "sound volume" is set as an operation instruction for the audio source, and "category/news" is set as a function thereof. Furthermore, in the category of news, "fishing/news A" is set based on a selection by an occupant in the driver seat according to his/her interest or preference.

Figure 7:
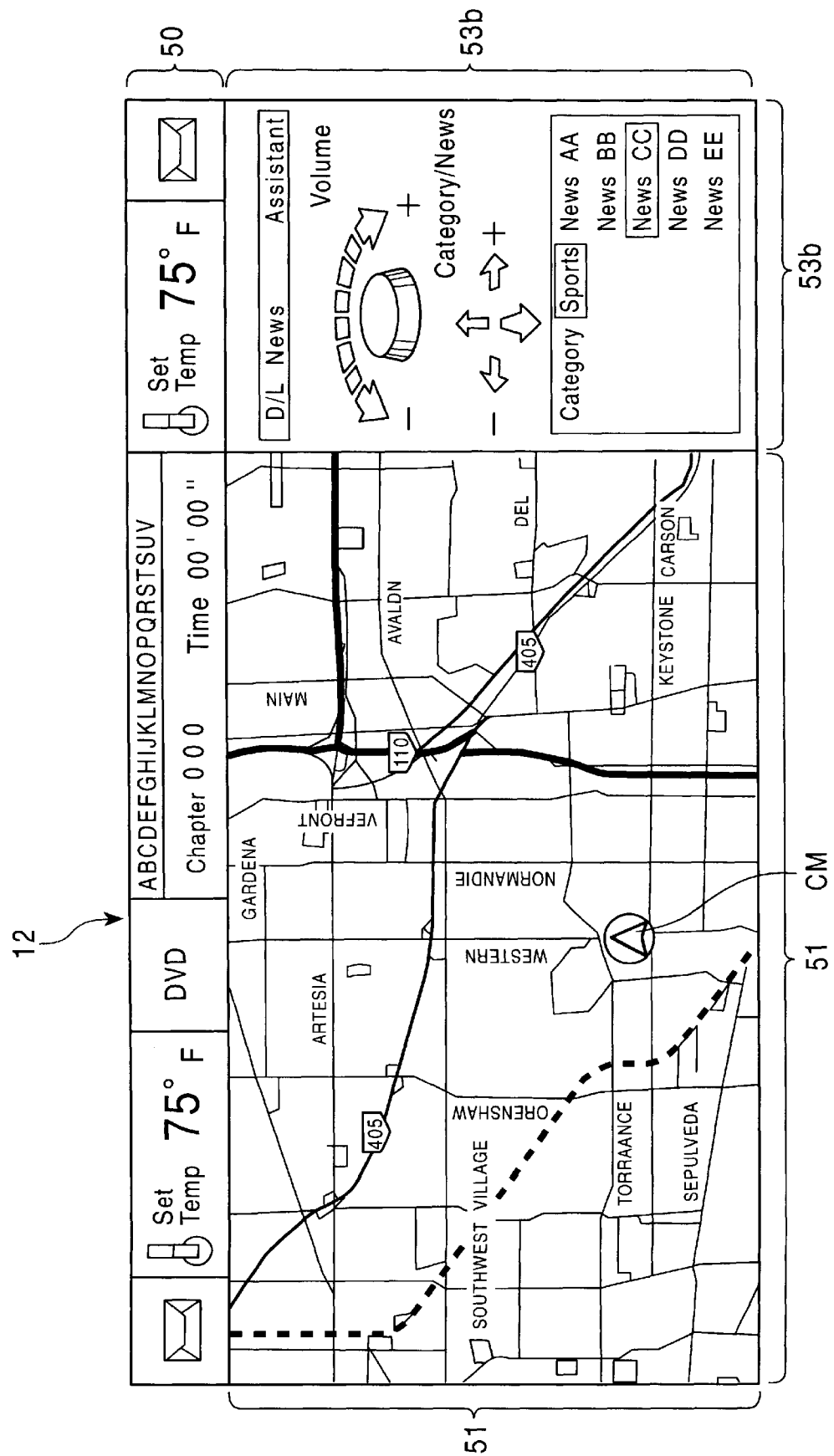
FIG. 7 is an illustration of a fourth example display screen related to switching of the display of an operation guidance screen.

Similar to FIG. 6, FIG. 7 shows an example display screen relating to the display of operation guidance associated with an audio source, which is displayed when the passenger operation key 31b is operated in a state where similarly the audio operation mode has been selected, and an operation instruction and a function for the audio source have been set.

In the example display screen shown in FIG. 7, as in FIG. 6, "sound volume" is set as an operation instruction for the audio source, and "category/news" is set as a function thereof. In this example, "sports/news CC" is set based on a selection by an occupant in the passenger seat according to his/her interest or preference.

The mutual relationship between the display screens shown in FIGS. 6 and 7 is the same as that between the display screens shown in FIGS. 4 and 5. That is, when the passenger operation key 31b is operated in the state of the display screen shown in FIG. 6, the display of operation guidance, which had been on the driver-seat side, is switched to the passenger-seat side (operation guidance screen 53b in FIG. 7). Conversely, when the driver operation key 31a is operated in the state of the display screen shown in FIG. 7, the display of operation guidance, which had been on the passenger-seat side, is switched to the driver-seat side (operation guidance screen 53a in FIG. 6).

Figure 8:
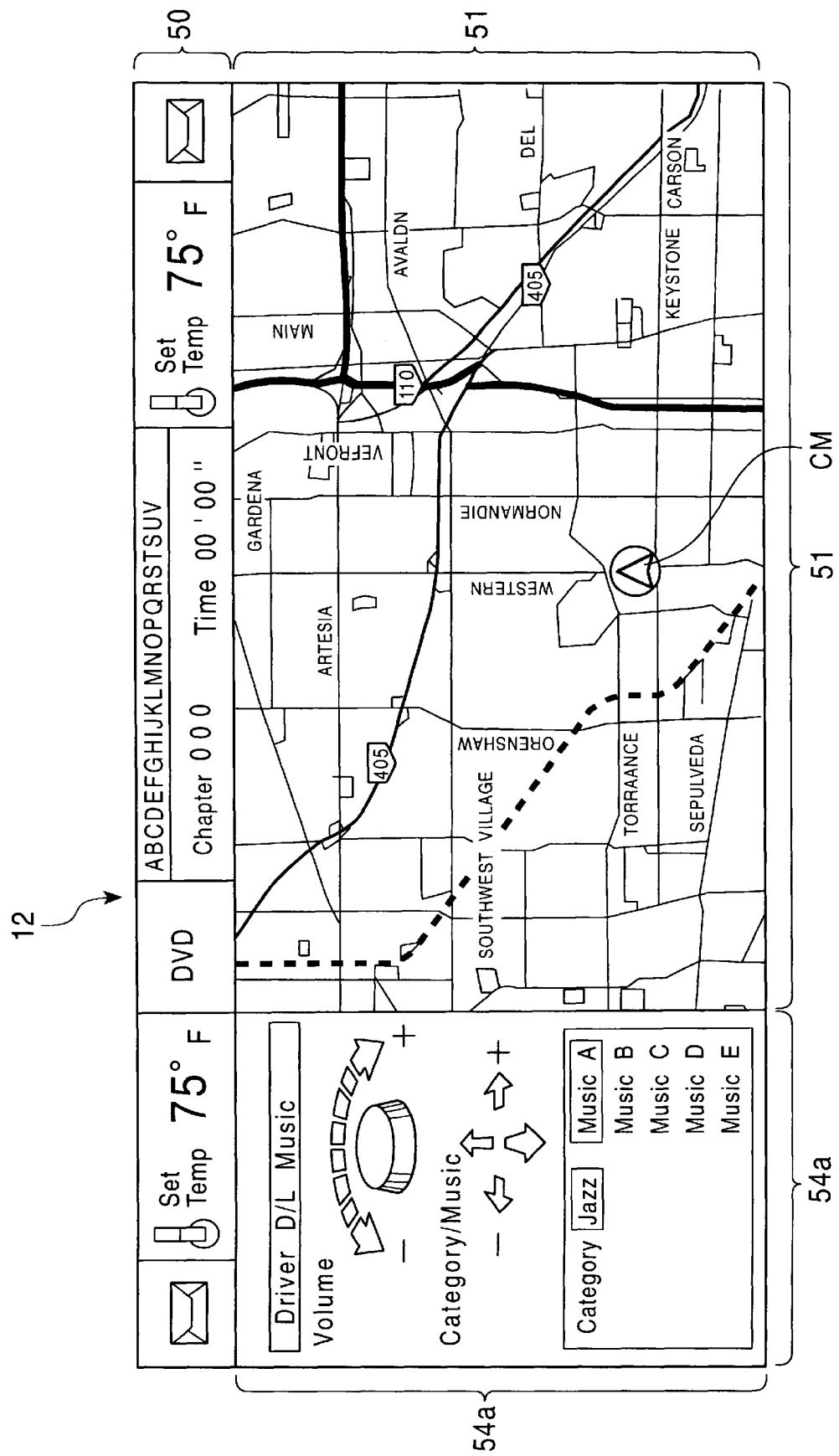
FIG. 8 is an illustration of a fifth example display screen related to switching of the display of an operation guidance screen.

FIG. 8 shows an example display screen relating to the display of operation guidance associated with an audio source, which is displayed when the driver operation key 31a is operated in a state where the audio operation mode has been selected using the SOURCE key 33, and an operation instruction and a function for the audio source have been selected using the haptic commander 35 and the joystick 36.

In the example display screen shown in FIG. 8, "sound volume" is set as an operation instruction for the audio source, and "category/music" is selected as a function thereof. Furthermore, in the category of music, "jazz/music A" is set based on a selection by an occupant in the driver seat according to his/her interest or preference.

Figure 9:
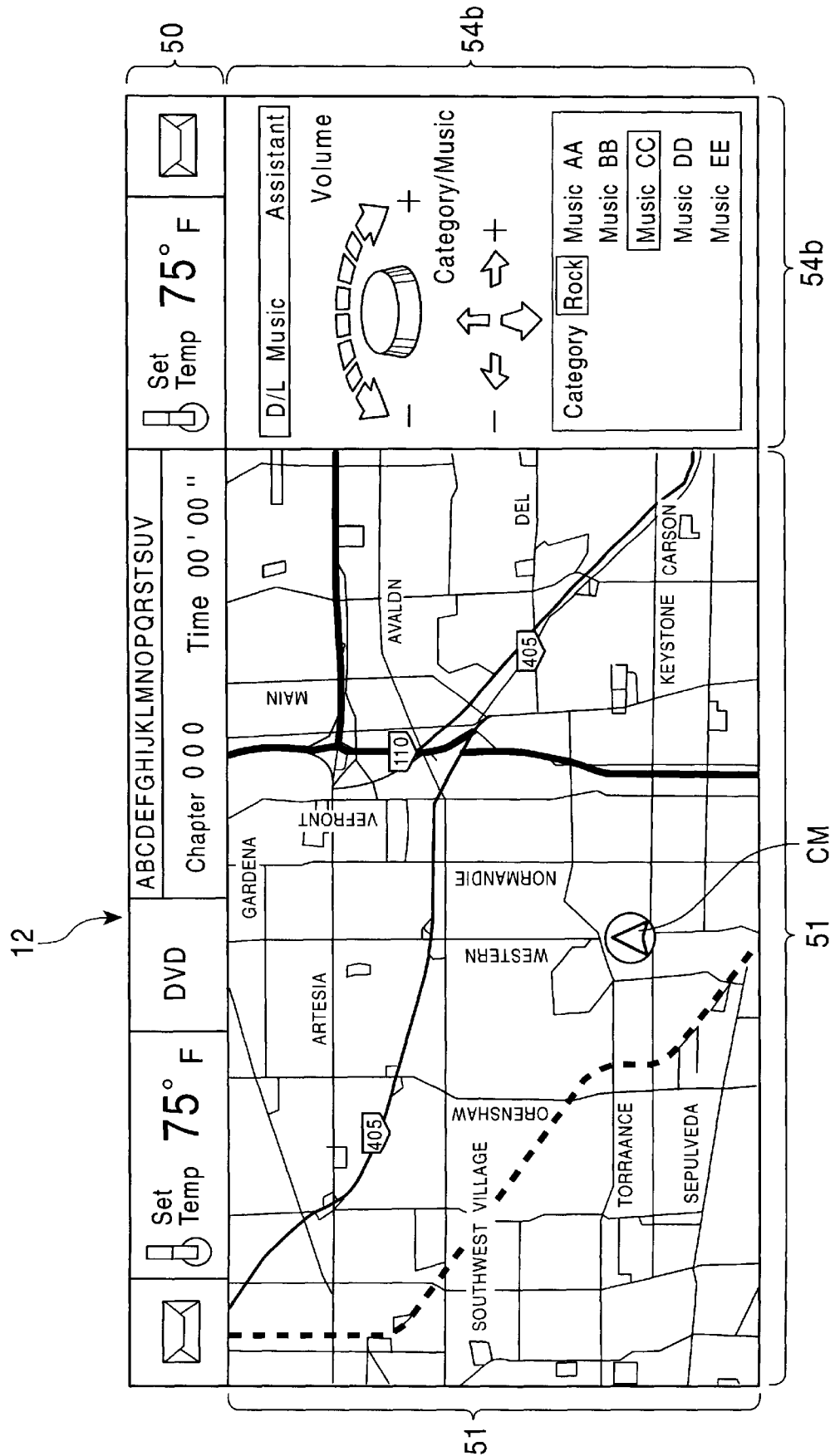
FIG. 9 is an illustration of a sixth example display screen related to switching of the display of an operation guidance screen.

Similar to FIG. 8, FIG. 9 shows an example display screen relating to the display of operation guidance associated with an audio source, which is displayed when the passenger operation key 31b is operated in a state where similarly the audio operation mode has been selected, and an operation instruction and a function for the audio source have been set.

In the example display screen shown in FIG. 9, as in FIG. 8, "sound volume" is set as an operation instruction for the audio source, and "category/music" is set as a function thereof. In this example, "rock/music CC" is set based on a selection by an occupant in the passenger seat according to his/her interest or preference.

The mutual relationship between the display screens shown in FIGS. 8 and 9 is the same as that between the display screens shown in FIGS. 6 and 7. Thus, when the passenger operation key 31b is operated in the state of the display screen shown in FIG. 8, the display of operation guidance, which had been on the driver-seat side, is switched to the passenger-seat side (operation guidance screen 54b in FIG. 9). Conversely, when the driver operation key 31a is operated in the state of the display screen shown in FIG. 9, the display of operation guidance, which had been on the passenger-seat side, is switched to the driver-seat side (operation guidance screen 54a in FIG. 8).

As described hereinabove, according to the on-vehicle display apparatus 10 of this embodiment, the display of the operation guidance screen is switched between the driver-seat side and the passenger-seat side of the display screen on the display unit 12 based on the operations of the driver operation key 31a and the passenger operation key 31b in the operation unit 11 (i.e., displayed at a position closer to an associated seat). Thus, display of operation guidance is easier to understand and operations are facilitated both for an occupant in the driver seat and for an occupant in the passenger seat. Accordingly, visibility and ease of operation are improved.

Furthermore, the on-vehicle display apparatus 10 according to this embodiment is implemented entirely in the form of a module, and is embedded in a central portion of the console panel 20. Thus, flexibility in layout of the components including the operation unit 11, the display unit 12, and the control unit 13 is achieved, and the functions can be effectively integrated.

In the embodiment described above, the display of the operation guidance screen is switched between the driver-seat side and the passenger-seat side of the display screen on the display unit 12 based on the operations of the driver operation key 31a and the passenger operation key 31b, as shown in FIGS. 4 to 9. Thus, for example, referring to FIG. 4, an area showing a map image (the map screen 51) in the display screen of the display unit 12 is restricted to an area not including the operation guidance screen 52a or the background information display area 50. That is, since the operation guidance screen 52a is at the front as viewed from an occupant, the map image behind the operation guidance screen is hidden and is not seen. Thus, in consideration of the entire screen, the area showing the map is restricted, leading to poor visibility of the map.

Figure 10:
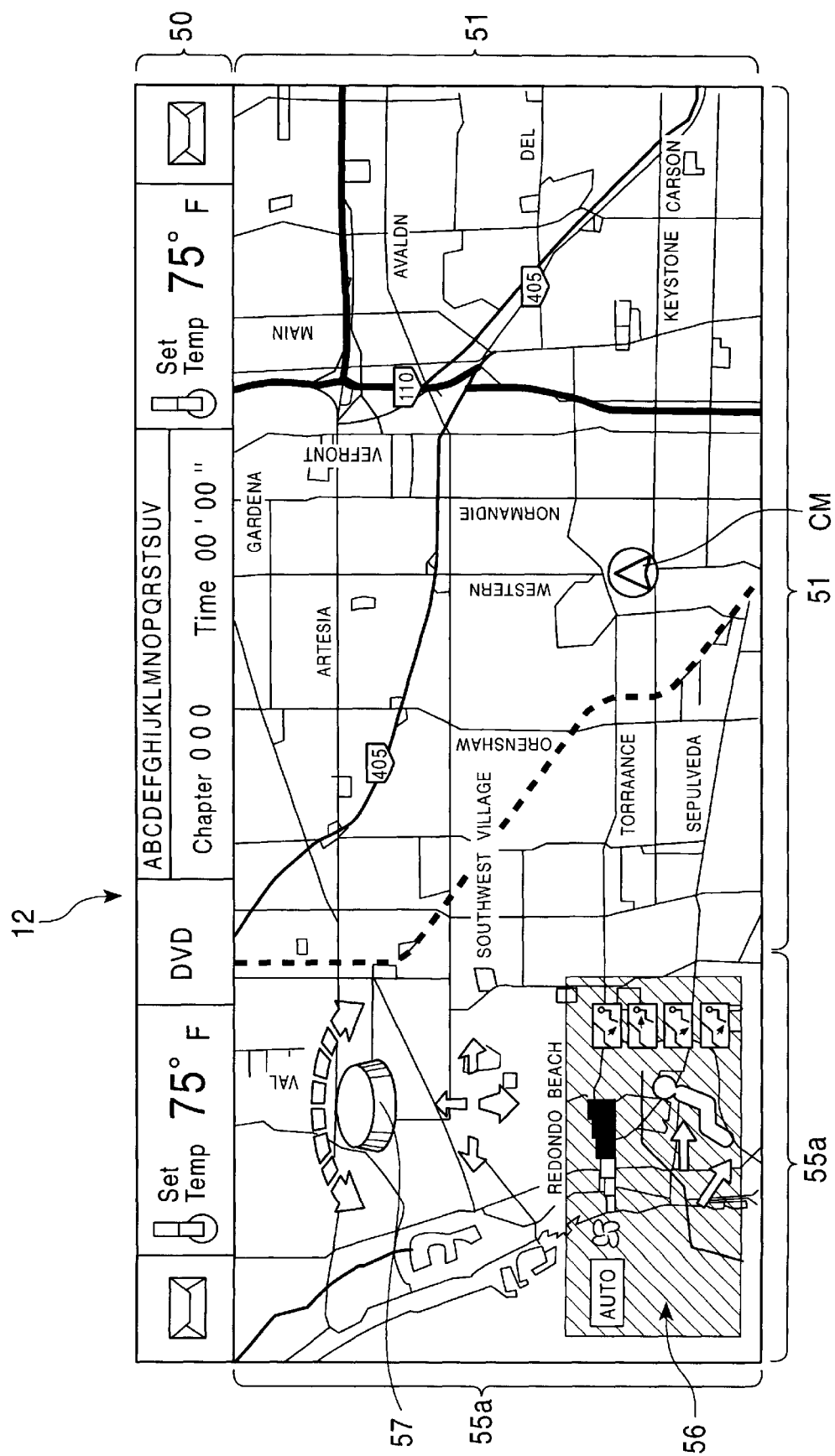
FIG. 10 is an illustration of a seventh example display screen related to switching of the display of an operation guidance screen.

In order to avoid this situation, for example, a section not including a minimum display section required in the display area of the operation guidance screen (i.e., a display section associated with an operation instruction and function setting status for an apparatus displayed in the area) may be displayed transparently. FIG. 10 shows an example display screen of such a case.

As shown in the example display screen in FIG. 10, a remaining section, not including the required section, in an operation guide display area 55a, is displayed transparently, so that a map behind the transparent display section is seen. Thus, since the area in which the map is seen in the display screen of the display unit 12 is relatively increased, visibility of the map is improved.

Furthermore, in the example display screen shown in FIG. 10, a display section 56 (shown as hatched) in the operation guidance display area 55a, associated with the function setting status of an apparatus, is displayed semi-transparently, and a display section 57, associated with the content of an operation instruction for an apparatus, is displayed opaquely. In this case, a map behind the semi-transparent display section 56 can be recognized similarly to a map behind the transparent display section, although it may be somewhat inferior in terms of visibility.

Although the display section 57 associated with the content of an operation instruction for an apparatus is displayed opaquely in the example display screen shown in FIG. 10, the display section 57 may be displayed semi-transparently similarly to the display section 56 associated with the function setting status of an apparatus. This further improves visibility of the map.

Furthermore, although the driver operation key 31a and the passenger operation key 31b are provided as means for switching the display of the operation guidance screen in the display screen of the display unit 12 in the embodiment described above, the means for switching the display of the operation guidance screen is not limited thereto. For example, instead of the operation keys 31a and 31b, an infrared sensor may be attached to an appropriate position of the module unit 10 shown in FIG. 3. In this case, the infrared sensor responds to a hand of an occupant in the driver seat or an occupant in the passenger seat coming closer thereto, and based on the resulting response signal, the control unit 13 shown in FIG. 1 switches the display of the operation guidance screen in the display screen of the display unit 12 between the driver-seat side and the passenger-seat side. By employing such non-contact switching means as the infrared sensor, the need for explicit operations associated with the operation keys 31a and 31b is eliminated, further improving ease of operation.

What is claimed is:

1. An on-vehicle display apparatus connected to a plurality of apparatuses mounted on a vehicle, said on-vehicle display apparatus comprising:

an operation unit including an operation switch for issuing operation instructions selectively to the plurality of apparatuses, and including an operation detecting means for detecting whether an operation is performed by an occupant in a driver seat or by an occupant in a passenger seat;

a display unit including a display screen; and a control unit for controlling said display unit according to an operation of said operation unit, wherein said control unit controls said display unit so that an operation guidance screen associated with an apparatus selected from the plurality of apparatuses will be displayed on a driver-seat side of the display screen when it is detected that the occupant in the driver seat is operating said operation unit, whereas the operation guidance screen will be displayed on a passenger-seat side of the display screen when it is detected that the occupant in the passenger seat is operating said operation unit.

2. An on-vehicle display apparatus according to claim 1, wherein said operation detecting means includes an operation key for the occupant in the driver seat and an operation key for the occupant in the passenger seat, the operation key for the occupant in the driver seat being disposed closer to the driver seat and the operation key for the occupant in the passenger seat being disposed closer to the passenger seat.

3. An on-vehicle display apparatus according to claim 1, wherein said operation unit, said display unit, and said control unit are embedded, in the form of an integrated module unit, in a console panel in a vehicle cabin.

4. An on-vehicle display apparatus according to claim 3, wherein said operation detecting means is implemented by a non-contact sensor provided in the module unit, and detects motion of the occupant in the driver seat or motion of the occupant in the passenger seat coming closer to said operation detecting means.

5. An on-vehicle display apparatus according to claim 4, wherein the non-contact sensor is an infrared sensor attached to the module unit.

6. An on-vehicle display apparatus according to claim 1, wherein said control unit controls said display unit so that a map screen associated with navigation will be displayed on the opposite side of the operation guidance screen on the display screen and so that the map screen will be moved to the opposite side when the display position of the operation guidance screen is switched.

7. An on-vehicle display apparatus according to claim 1, wherein said control unit controls said display unit so that the operation guidance screen is displayed semi-transparently.

8. An on-vehicle display apparatus according to claim 1, wherein said control unit controls said display unit so that a remaining section other than a display section associated with the content of an operation instruction and the function setting status in the operation guidance screen will be displayed semi-transparently.

9. An on-vehicle display apparatus according to claim 1, wherein said operation unit includes a first set of operation keys for selecting an operation mode associated with one of the plurality of apparatuses, and also includes a second set of operation keys for changing an operation instruction and the function setting for the operation mode associated with the selected apparatus.

10. An on-vehicle display apparatus according to claim 9, wherein the operation modes respectively associated with the plurality of apparatuses include an air conditioner operation mode, an audio operation mode, and a navigation operation mode.

11. An on-vehicle display apparatus according to claim 9, wherein the second set of operation keys includes a haptic operation key.

12. An on-vehicle display apparatus according to claim 1, further comprising a speaker for providing information relating to the content of an operation instruction and the function setting status for the selected apparatus.

13. An on-vehicle display apparatus connected to a plurality of apparatuses mounted on a vehicle, said on-vehicle display apparatus comprising:

an operation unit including an operation switch for issuing operation instructions selectively to the plurality of apparatuses, and including operation detecting means for detecting whether an operation is performed by an occupant in a driver seat or by an occupant in a passenger seat;

a display unit including a display screen; and a control unit for controlling said display unit according to an operation of said operation unit, wherein said control unit stores the function setting status respectively set by the occupant in the driver seat and by the occupant in the passenger seat, and controls said display unit so that an operation guidance screen associated with an apparatus selected from the plurality of apparatuses will be displayed on a driver-seat side of the display screen based on the function setting status set by the occupant in the driver seat when it is detected that the occupant in the driver seat is operating said operation unit, whereas the operation guidance screen will be displayed on a passenger-seat side of the display screen based on the function setting status set by the occupant in the passenger seat when it is detected that an occupant in the passenger seat is operating said operation unit.

14. An on-vehicle display apparatus according to claim 13, wherein said control unit stores a category of music set by the occupant in the driver seat and the occupant in the passenger seat.

15. An on-vehicle display apparatus according to claim 13, wherein said control unit stores a category of news set by the occupant in the driver seat and the occupant in the passenger seat.

16. An on-vehicle display apparatus according to claim 13, wherein said control unit stores a temperature on a driver-seat side, set by the occupant in the driver seat, and a temperature on a passenger-seat side, set by the occupant in the passenger seat.

17. A method of operating an on-vehicle display apparatus having a display unit with a display screen and an operation unit for issuing operation instructions to at least one vehicle apparatus, the method comprising:

selecting a vehicle apparatus for operation;

detecting whether an operation is performed by an occupant in a driver seat or by an occupant in a passenger seat; and displaying, on a portion of said display screen, an operation guidance screen associated with said selected vehicle apparatus;

wherein said operation guidance screen is displayed on a driver seat side of the display screen when said operation is performed by an occupant in the driver seat, and said operation guidance screen is displayed on a passenger seat side of the display screen when said operation is performed by an occupant in the passenger seat.

18. A method according to claim 17, wherein said operation unit includes an operation key, disposed closer to the driver seat, for the occupant in the driver seat and an operation key, disposed closer to the passenger seat, for the occupant in the passenger seat, and the detected operation is the operation of one of the operation keys.

19. A method according to claim 17, wherein the on-vehicle display apparatus is provided in a console in the cabin of the vehicle at a position substantially between the driver seat and the passenger seat.

20. A method according to claim 19, wherein the act of detecting an operation is performed by a sensor that detects a motion of the occupant in the driver seat or a motion of the occupant in the passenger seat.

21. A method according to claim 17, wherein at least a portion of the operation guidance screen is displayed semi-transparently.

* * * * *